United States Patent
Wang

(10) Patent No.: US 6,404,758 B1
(45) Date of Patent: Jun. 11, 2002

(54) SYSTEM AND METHOD FOR ACHIEVING SLOT SYNCHRONIZATION IN A WIDEBAND CDMA SYSTEM IN THE PRESENCE OF LARGE INITIAL FREQUENCY ERRORS

(75) Inventor: Yi-Pin Eric Wang, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/294,644

(22) Filed: Apr. 19, 1999

(51) Int. Cl.⁷ .............................................. H04L 27/30
(52) U.S. Cl. ........................ 370/342; 370/335; 370/350; 370/441; 370/503; 370/515; 375/143; 375/150; 375/152; 375/343; 375/363; 375/366; 455/39; 455/73; 455/130
(58) Field of Search ................................ 370/335, 342, 370/350, 441, 503, 515; 375/143, 343, 362, 363, 365, 366; 455/39, 73, 130

(56) References Cited

U.S. PATENT DOCUMENTS

| | | | | |
|---|---|---|---|---|
| 5,377,225 A | * | 12/1994 | Davis | 375/1 |
| 5,709,588 A | * | 1/1998 | Fukawa et al. | 375/200 |
| 5,793,796 A | * | 8/1998 | Hulbert et al. | 375/206 |
| 5,799,010 A | * | 8/1998 | Lomp et al. | 370/335 |
| 5,867,525 A | * | 2/1999 | Giallorenzi et al. | 375/206 |
| 5,991,332 A | * | 11/1999 | Lomp et al. | 375/206 |
| 6,028,887 A | * | 2/2000 | Harrison et al. | 375/206 |
| 6,078,576 A | * | 6/2000 | Schilling et al. | 370/347 |
| 6,128,332 A | * | 10/2000 | Fukawa et al. | 375/146 |
| 6,272,168 B1 | * | 2/2001 | Lomp et al. | 375/206 |
| 6,229,843 B1 | * | 10/2001 | Lomp et al. | 375/150 |

OTHER PUBLICATIONS

*Low–power Correlator Architectures for Wideband CDMA Code Acquisition*, The Thirty–third Asilomar Conference on Signals, Systems & Computers, Online!, Sundararajan Sriram, et al., Oct. 24–27, 1999, pp. 125–129, XP002141510.

Patent Abstracts of Japan, *Synchronization Method for Digital Radio Communication*, Nippon Motorola Ltd., Publication No. 07097075, Publication Date: Mar. 31, 1995.

* cited by examiner

Primary Examiner—Daniel Hunter
Assistant Examiner—Stephen D'Agosta
(74) Attorney, Agent, or Firm—Gregory Stephens Moore & Van Allen PLLC

(57) ABSTRACT

A system and method are provided for achieving slot synchronization in a Wideband CDMA system in the presence of large initial frequency errors. A FSC matched filter having a reduced coherence window is provided for reducing degradation of a symbol due to carrier phase rotation resulting from oscillator error, thereby preventing severe loss of signal energy at the peaks of the FSC matched filter output. Additionally, a circular sliding integrator is provided to combine the accumulated disbursed signal energies due to the oscillator error and multipath interference, thereby allowing easier identification of the time index representing the time slot boundary. Further, a sorter is provided for determining a predetermined number of time index candidates representing the time slot boundary, thereby increasing the possibility that the true time index boundary is sent to the second stage of synchronization.

28 Claims, 3 Drawing Sheets

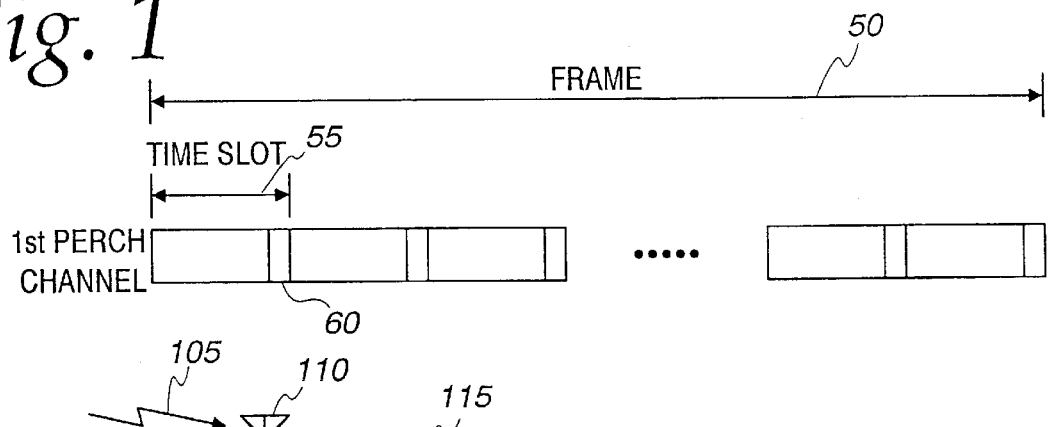
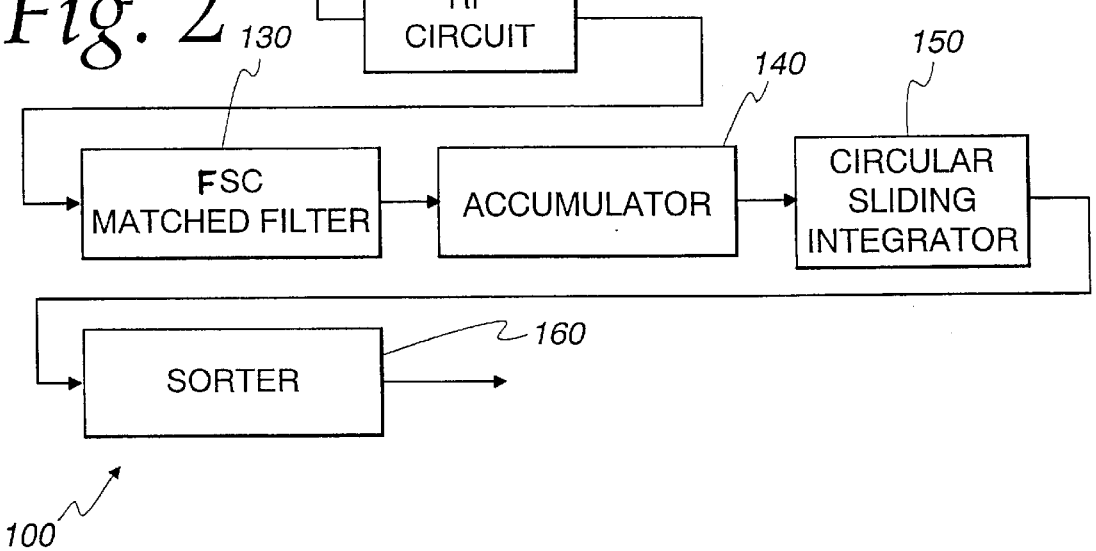
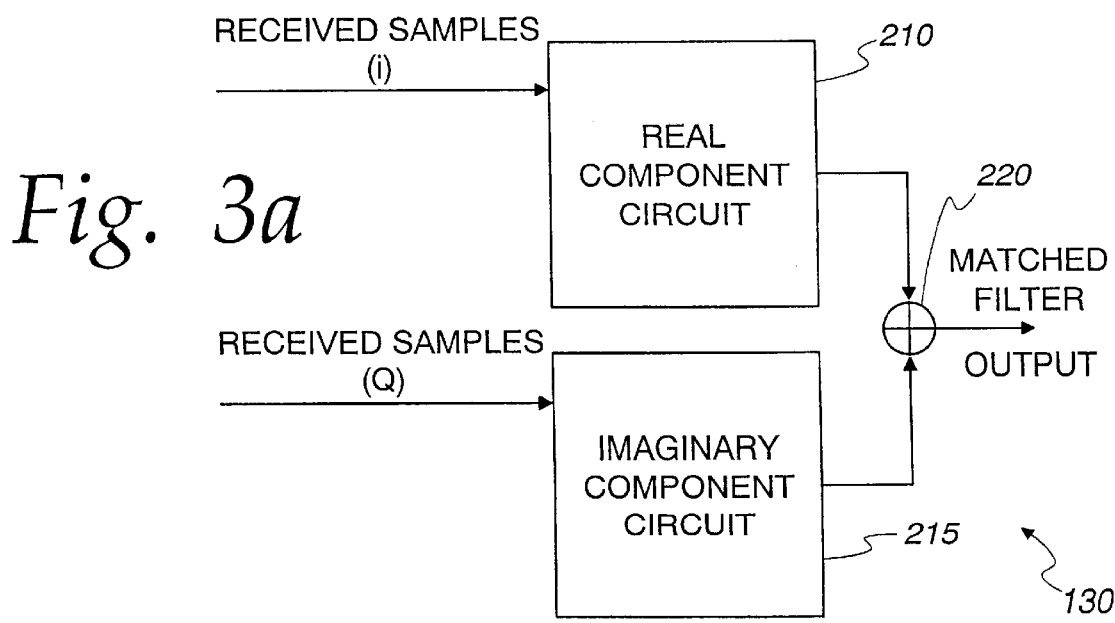

SYSTEM AND METHOD FOR ACHIEVING SLOT SYNCHRONIZATION IN A WIDEBAND CDMA SYSTEM IN THE PRESENCE OF LARGE INITIAL FREQUENCY ERRORS

FIELD OF THE INVENTION

This invention relates to the synchronization process in a Wideband CDMA system, and more particularly, to achieving slot synchronization in a Wideband CDMA system in the presence of large initial frequency errors using a matched filter having a reduced coherence window and a circular sliding integrator.

BACKGROUND OF THE INVENTION

In a cellular communications system using Wideband code division multiple access (W-CDMA) protocols, a first search code (FSC) of 256 chips long is transmitted in every time slot. By synchronizing to the FSC of the received signal, a mobile station can identify the time slot boundary of the downlink signals. Typically, a FSC matched filter is used to synchronize to the FSC. FSC synchronization is done by identifying the peaks of the FSC matched filter output. However, because the accuracy of an oscillator used in a mobile station is typically in the range of 2.5 to 15 parts per million (ppm), the FSC synchronization must often be performed in the presence of large frequency errors.

The working assumption for the oscillator accuracy is 10 ppm. Since the operating frequency for current W-CDMA systems, for example, the IMT-2000 system, is 1.9–2.0 GHz, using a 10 ppm oscillator results in initial frequency errors of up to 20 KHz. As 1 FSC symbol is of duration 0.0625 milliseconds, a 20 KHz frequency error causes up to a 450° phase rotation per periodic channel symbol, thereby severely degrading performance of the FSC matched filter. Current matched filters are able to tolerate frequency errors of up to 5 KHz before the phase rotation per chip due to the frequency error degrades performance of the matched filter. Thus, a mobile station needs to hypothesize oscillator frequency errors and adjust its oscillator frequency according to each hypothesis such that the actual frequency error for the best hypothesis is less than 5 KHz. This requires the mobile station to make up to 4 frequency error hypotheses before finding the slot boundary, where each frequency hypothesis is verified by checking the CRC code, thereby greatly increasing power consumption and synchronization time.

Because the same FSC is used by all of the cells and sectors, and occurs in the same position of every time slot, the FSC is used to find the location of slot boundaries. An accumulator accumulates the output of the FSC matched filter over a specified number of time slots, thereby overcoming noise in the received signal as the energy peaks due to the FSC accumulate faster than the energy peaks due to noise. However, due to the inaccuracy of the oscillator and multipath interference, the position where the peaks occur changes gradually, resulting in the energy peaks accumulated by the accumulator being dispersed over multiple time indices.

Additionally, noise in the received signal could result in energy peaks in the FSC matched filter output greater than those due to the FSC, even after accumulation. This increases the probability that the wrong time index will be sent to the next stage of synchronization, thereby resulting in misidentification of the time slot boundary.

The invention is directed to overcoming one or more of the problems discussed above in a novel and simple manner.

SUMMARY OF THE INVENTION

In accordance with the invention, a receiver uses a first search code (FSC) matched filter having a reduced coherence window to reduce a phase rotation of a received signal resulting from an oscillator error. Additionally, the receiver uses a circular sliding integrator to combine energy dispersed during the accumulation process as a result of the oscillator error and multipath interference. Further, a sorter determines a predefined number of largest energy peaks from an output of the circular sliding integrator, eliminating those energy peaks resulting from the circular sliding integrator, thereby increasing the probability of a time index representing a time slot boundary being sent to a next stage of the synchronization process.

Broadly, there is disclosed herein a receiver for improving slot synchronization in a Wideband code division multiple access (W-CDMA) communications system by overcoming oscillator error and multipath interference, the receiver having a matched filter for receiving a signal including a FSC, where the matched filter utilizes a reduced coherence window for decreasing the degradation of a symbol due to a carrier phase rotation resulting from the oscillator error. The receiver further includes an accumulator coupled to the matched filter for accumulating an output of the matched filter over an accumulation window of time slots. A circular sliding integrator is coupled to the accumulator for combining dispersed energy from an output of the accumulator over an integration window. Additionally, a sorter is coupled to the circular sliding integrator for determining a specified number of candidate time indices for a time slot boundary using an output of the circular sliding integrator.

It is a feature of the invention that the matched filter is a FSC matched filter.

It is another feature of the invention that the size of the coherence window is determined using a desired phase rotation within the coherence window, a chip duration and an actual frequency error due to the oscillator.

It is another feature of the invention that the matched filter includes a shift register having a number of elements less than a number of chips forming the symbol, for holding a portion of the received signal. The matched filter further includes a multiplying-integrating processing circuit coupled to the shift register for multiplying the portion of the received signal in the shift register with a portion of the FSC, and integrating the products. Further, the matched filter includes a phase elimination circuit coupled to the multiplying-integrating processing circuit for removing phase information from a result produced by the multiplying-integrating processing circuit.

It is yet another feature of the invention that the circular sliding integrator is a first integrator, and the receiver includes a shift register having a number of elements equal to a number of chips comprising the symbol for receiving the received signal. The receiver further includes a buffer coupled to the shift register for receiving a portion of the received signal from the shift register, a multiplying-integrating processing circuit coupled to the buffer for multiplying the portion of the received signal in the buffer with a portion of the FSC, and integrating the products. The receiver further includes a phase elimination circuit coupled to the multiplying-integrating processing circuit for removing phase information from a result produced by the multiplying-integrating processing circuit, a storage device coupled to the phase elimination circuit for storing a result produced by the phase elimination circuit, and a second integrator coupled to the storage device for integrating the stored results.

It is a further feature of the invention that the size of the accumulation window is determined using a signal-to-noise ratio.

It is still another feature of the invention that the size of the integration window is determined using the oscillator error, a chip duration and size of the accumulation window.

There is disclosed in accordance with another aspect of the invention a receiver for improving initial slot synchronization in a W-CDMA communications system by overcoming oscillator error. The receiver includes a matched filter for receiving a signal including a FSC, the matched filter utilizing a reduced coherence window for decreasing the degradation of a symbol due to a carrier phase rotation resulting from the oscillator error. An accumulator is coupled to the matched filter for accumulating an output of the matched filter over an accumulation of time slots, and an integrator is coupled to the accumulator for combining dispersed energy from an output of the accumulator over an integration window.

It is a feature of the invention that the matched filter is a FSC matched filter.

It is a feature of the invention that the size of the coherence window is determined using a desired phase rotation within the coherence window, a chip duration and an actual frequency error due to the oscillator.

It is another feature of the invention that the matched filter includes a shift register having a number of elements less than a number of chips forming the symbol for holding a portion of the received symbol. A multiplying-integrating processing circuit is coupled to the shift register for multiplying a portion of the received signal in the shift register with a portion of the FSC, and integrating the products. And a phase eliminator circuit is coupled to the multiplying-integrating processing circuit for removing phase information from a result produced by the multiplying-integrating processing circuit.

It is yet another feature of the invention that the circular sliding integrator is a first integrator, and the receiver includes a shift register having a number of elements equal to a number of chips comprising the symbol for receiving the received signal. The receiver further includes a buffer coupled to the shift register for receiving a portion of the received signal from the shift register, a multiplying-integrating processing circuit coupled to the buffer for multiplying the portion of the received signal in the buffer with a portion of the FSC, and integrating the products. The receiver further includes a phase elimination circuit coupled to the multiplying-integrating processing circuit for removing phase information from a result produced by the multiplying-integrating processing circuit, a storage device coupled to the phase elimination circuit for storing a result produced by the phase elimination circuit, and a second integrator coupled to the storage device for integrating the stored results.

It is a further feature of the invention that the receiver includes a sorter coupled to the integrator for determining a specified number of candidate time indices for a time slot boundary using an output of the integrator.

In another embodiment of the invention, a receiver for improving initial slot synchronization in a W-CDMA communications system by overcoming oscillator error includes a matched filter receiving a signal including a FSC, where the matched filter decreases the degradation of a symbol due to a carrier phase rotation resulting from the oscillator error. An accumulator is coupled to the matched filter, the accumulator including a predetermined number of storage locations for accumulating an output of the matched filter over an accumulation window of time slots. An integrator is coupled to the accumulator for combining dispersed energy from an output of the accumulator over an integration window.

It is a feature of the invention that the size of the integration window is determined using an oscillator error and size of the accumulation window.

It is another feature of the invention that the predetermined number of storage locations equal the number of chips per slot, and the integrator is a sliding integrator wherein the integration window moves across the predetermined number of storage locations. The sliding integrator may be a circular sliding integrator, wherein when the integration window extends beyond a final storage location, the integration window extends to a first storage location, thereby operating in a circular fashion.

It is a further feature of the invention that a sorter is coupled to the integrator for determining a specified number of candidate time indices for a time slot boundary using an output of the integrator.

Broadly, there is disclosed herein a method for improving slot synchronization in a W-CDMA communications system by overcoming oscillator error and multipath interference. The method includes receiving a signal including a FSC. The received signal is filtered using a matched filter having a reduced coherence window. The filtered signal is accumulated over an accumulator window of time slots to overcome noise in the filtered signal, and the accumulated signal is integrated over an integration window to combine dispersed energy in the accumulated signal.

It is a feature of the invention that filtering the received signal includes filtering the received signal using a FSC matched filter.

It is another feature of the invention that filtering the received signal includes shifting a portion of the received signal into a shift register, multiplying a portion of the received signal with a portion of the FSC, integrating the products using a multiplying-integrating processing circuit, and removing phase information from a result produced by the multiplying-integrating processing circuit using a phase elimination circuit.

It is a further feature of the invention that the step of filtering the received signal includes shifting the received signal into a shift register, buffering a portion of the received signal from the shift register, and multiplying the portion of the received signal with a portion of the FSC and integrating the products using a multiplying-integrating processing circuit. The step of filtering further includes removing phase information from a result produced by the multiplying-integrating processing circuit using a phase elimination circuit, storing the result of the phase elimination circuit, and integrating the stored results.

It is yet an additional feature of the invention that accumulating the filtered signal includes determining a signal-to-noise ratio for the received signal.

In yet a further aspect of the invention, integrating the accumulated signal further includes moving the integration window across memory locations storing the accumulated signal. Additionally, moving the integration window may include extending the integration window to a first storage location for the accumulated signal when the integration window extends beyond a final storage location for the accumulated signal.

In yet a further aspect of the invention, a specified number of candidate time indices is determined for a time slot boundary using the integrated signal.

In still a further aspect of the invention, determining the specified number of candidate time indices further includes determining a first candidate time index for a largest integrator output value, zeroing out neighboring index values of the first candidate time index, determining an additional candidate time index for a next largest integrator output value, and zeroing out the neighboring time index values of the additional candidate time index. Determining additional candidate time indices for the next largest integrator output values and zeroing out the neighboring time indices is repeated until the specified number of candidate time indices is reached.

In another feature of the invention, the specified number of determined candidate time indices is communicated to a second stage synchronizer.

BRIEF DESCRIPTION OF THE DRAWINGS

FIG. 1 illustrates the transmission format for the first periodic channel of a Wideband CDMA cellular communications system;

FIG. 2 is a functional block diagram of a receiver in accordance with the invention;

FIG. 3a is a functional block diagram of a FSC matched filter in accordance with an embodiment of the invention;

DETAILED DESCRIPTION OF THE INVENTION

Figure 3B:
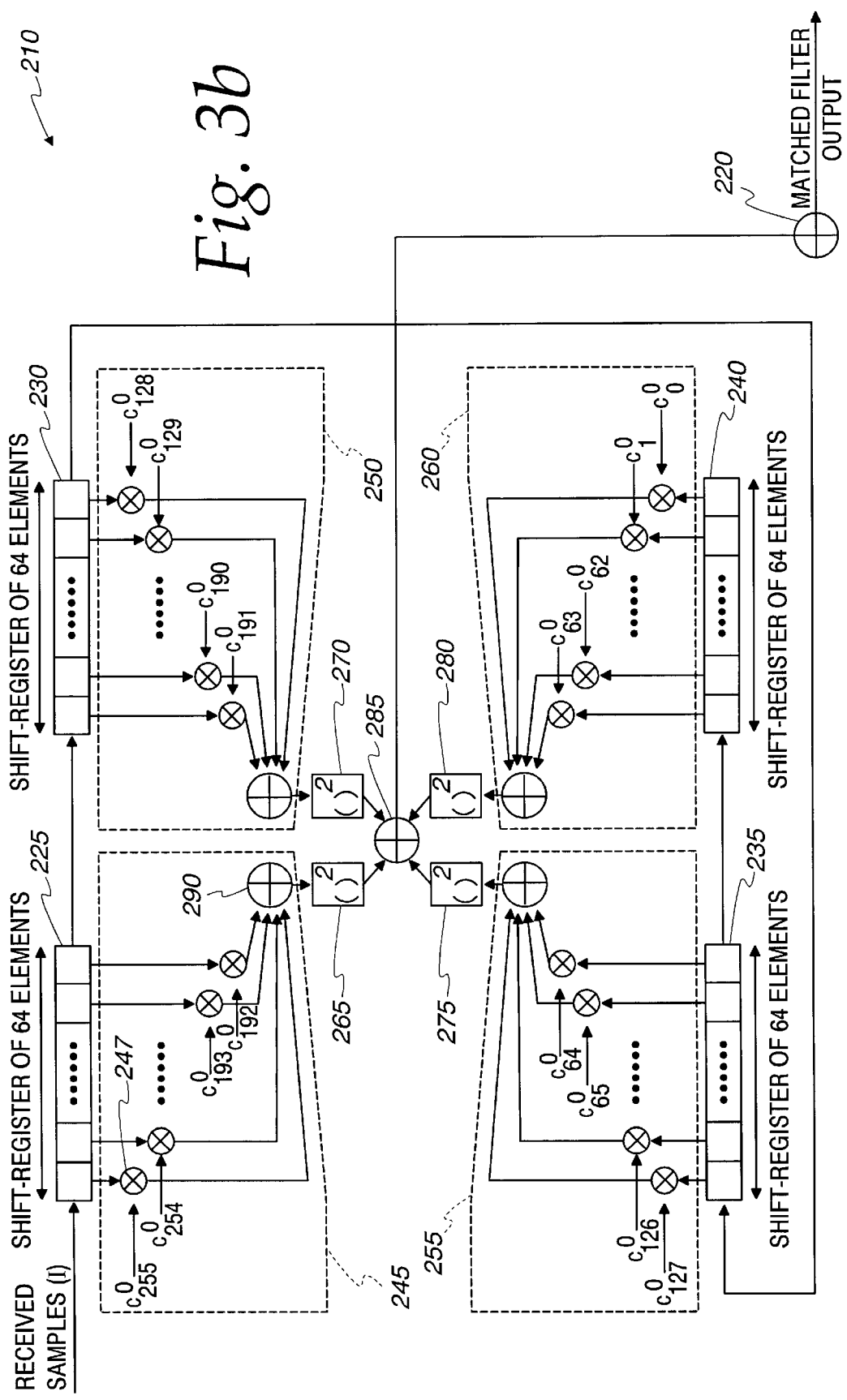
FIG. 3b is a functional block diagram of the real component circuit of the FSC matched filter in accordance with an embodiment of the invention.

When a cellular station is able to utilize a first search code (FSC) matched filter having a reduced coherence window, degradation of a symbol due to the phase rotation resulting from the oscillator error is decreased, thereby increasing performance of the matched filter. Additionally, after accumulation has been performed, a circular sliding integrator combines dispersed signal energy due to oscillator error and multipath interference, allowing a more definitive determination of the time slot boundary location. Furthermore, the addition of a sorter capable of determining the time indices of a predefined number of largest energy peaks of the circular sliding integrator output, while eliminating those energy peaks due to the oscillator error, increases the probability that the time index representing the time slot boundary is sent to the next stage of the synchronization process.

The invention disclosed describes a system and method for filtering a received signal using a FSC matched filter having a reduced coherence window. Thus, the degradation of a symbol due to phase rotation resulting from the oscillator error is reduced, increasing performance of the matched filter. Additionally, the invention disclosed describes a system and method for integrating the accumulated output from the FSC matched filter using a circular sliding integrator. Such an integrator combines the disbursed signal energy from the accumulator due to the oscillator error and multipath interference, thereby increasing the energy peak at the time index representing the time slot boundary. Further, the invention disclosed describes a system and method for sorting the output from the circular sliding integrator for a predefined number of time indices representing the largest energy peaks, thereby increasing the probability that a time index representing the time slot boundary is sent to the next stage of the synchronization process.

FIG. 1 illustrates the transmission format for the first periodic channel (Perch) of a Wideband CDMA (W-CDMA) system. A frame 50 is shown and represents 16 time slots of information. Each time slot, for example, a time slot 55, includes ten symbols of information. The final symbol of each time slot, for example, a symbol 60, contains the FSC. The FSC is a known, preselect signal pattern used in every cell and sector of a W-CDMA system to allow the receiver to synchronize to the received signal. Each symbol is made up of 256 chips (not shown).

FIG. 2 illustrates a receiver 100 according to the invention. The receiver 100 includes an antenna 110 for receiving radio signals from a cellular station. The antenna 110 is connected to an RF circuit 115. The RF circuit 115 is coupled to an FSC matched filter 130, which is coupled to an accumulator 140. The accumulator 140 is coupled to an integrator 150. The integrator 150 is further connected to a sorter 160. Candidate time indices for the time slot boundary determined by the sorter 160 are passed to the second stage of the synchronization process (not shown).

In operation, a signal, represented by a waveline 105, is received by the antenna 110. The RF circuit 115 filters the signal 105 and converts the received radio frequency signal to a baseband signal, which consists of an in-phase (I) signal and a quadrature phase (Q) signal. The FSC matched filter 130 having a reduced coherence window further filters the signal by matching the signal to the FSC, where the output of the matched filter 130 is greatest when the portion of the received signal being processed is the FSC. The coherence window is considered a reduced coherence window because the number of chips processed at a time by the FSC matched filter is less than the number of chips per symbol. Using the reduced coherence window reduces the degradation of a symbol due to the carrier phase rotation resulting from the oscillator error, thereby preventing severe loss of signal energy at the output of the FSC matched filter 130. Composition and operation of the matched filter 130 is discussed in greater detail infra in relation to FIGS. 3a and 3b.

The accumulator 140 then accumulates the output from the FSC matched filter 130 over an accumulation window. The accumulation window size is determined from the signal-to-noise ratio (SNR) of the received signal, and generally ranges from 64–80 time slots. The accumulator 140 includes an accumulation register having 25–60 elements, each element representing a chip, or time index, of the received signal. As a whole, the 2560 time indices represent one time slot of information. As the output from the FSC matched filter 130 is greater when filtering the FSC portion of the signal than when filtering other portions of the signal, the time index representing the FSC, or time slot boundary in accumulator 140, will grow faster than the time indices representing the other portions of the signal. However, because of multipath interference and oscillator error (the oscillator operating frequency differential between the transmitting and receiving stations), the output of the FSC matched filter is dispersed over more than one time index. Regarding multipath interference, various paths of the same transmitted signal are received by the receiver at slightly offset time intervals, resulting in dispersed signal energy at the matched filter output. Regarding oscillator error, the signal is transmitted at a slightly different frequency than that of the receiver operating frequency, resulting in a continuous, gradual shift of the signal energy at the FSC matched filter output over one or more time indices.

The output from the accumulator 140 is then passed to the circular sliding integrator 150 where the dispersed energy from the output of the FSC matched filter 130 is combined, thereby overcoming the oscillator error and multipath interference. The circular sliding integrator 150 integrates over an integration window, where the integration window is a predetermined number of time indices calculated using the oscillator error, chip duration and size of the accumulation window. The integration window slides across the accumulator output register in single time index increments, integrating the energy from the time indices within the integration window and storing the result into a storage device in the circular sliding integrator 150. Composition and operation of the circular sliding integrator 150 is discussed infra in relation to FIGS. 5 and 6.

The circular sliding integrator 150 output is received by the sorter 160, where a predetermined number of time index candidate values for a time slot boundary are determined. The number of time index candidate values to be used may be determined experimentally during the system design stages, but is generally two. As signal noise may generate large energy peaks at the FSC matched filter output, having more than one time index value candidate increases the probability that the true time slot boundary will be included in the list of time indices sent to the second stage of synchronization.

FIG. 3a illustrates a FSC matched filter in accordance with an embodiment of the invention. The FSC matched filter 130 includes a real component circuit 210 for filtering the real component of the received signal, and an imaginary component circuit 215 for filtering the imaginary component of the received signal, each connected to a real and the imaginary component adder 220. As the makeup and functionality of the real component circuit 210 and the imaginary component circuit 215 are the same, only the makeup and functionality of the real component circuit 210 will be discussed.

FIG. 3b is a functional block diagram of the real component circuit of the FSC matched filter 130 in accordance with an embodiment of the invention. The real component circuit 210 includes a first shift register (SR) 225 having a least significant bit (LSB) coupled to a most significant bit (MSB) of a second SR 230. An LSB of the second SR 230 is coupled to an MSB of a third SR 235, and an LSB of the third SR 235 is coupled to an MSB of a fourth SR 240. Each of the SRs 225, 230, 235 and 240 are 64 element SRs, where each element of the SR stores a single chip of the received signal sample. Thus, all four SRs store 256 chips representing the equivalent of one symbol of the received signal.

The first SR 225 is further coupled to a first multiplying-integrating (MI) circuit 245. The MI circuit 245 includes 64 multipliers, for example, multiplier 247, for multiplying an element of the shift register 225 with a corresponding element from one of the 64 most significant chips of the FSC, as represented by $C_{192}$–$C_{255}$. For example, multiplier 247 multiplies the MSB of the SR 225 with $C_{255}$. After each element of the shift register is multiplied by a corresponding chip from the FSC, the elements are then integrated in an MI integrator 290. The MI integrator 290 is further coupled to phase elimination circuits shown as a first squaring circuit 265, for removing phase information by squaring the result produced by the MI integrator 290. The first squaring circuit 265 is further coupled to an integrator 285.

The second SR 230 is coupled to a second MI circuit 250 operating in the same manner as the first MI circuit 245, and is coupled to a second squaring circuit 270, which is in turn coupled to the integrator 285. Similarly, the third SR 235 is coupled to a third MI circuit 255 which is coupled to a third squaring circuit 275, which is in turn coupled to the integrator 285. In much the same way, the fourth SR 240 is coupled to a fourth MI circuit 260 which is coupled to a fourth squaring circuit 280, which is in turn coupled to the integrator 285. The integrator 285 integrates the products produced by the squaring circuits 265, 270, 275 and 280. The integrator 285 is coupled to the real and imaginary component adder 220, which adds the values produced by the real component circuit 210 and the imaginary component circuit 215 to produce an output from the matched filter 130.

In operation, a new chip from the received signal is shifted into the MSB of the first SR 225, where the LSB from the first SR 225 is shifted into the MSB of the second SR 230. The LSB of the second SR 230 is then shifted into the MSB of the third SR 235, and the LSB of the third SR 235 is shifted into the MSB of the fourth SR 240. The LSB of the fourth SR 240 is discarded.

Each element of the first SR 225 is multiplied with a corresponding chip from the 64 most significant chips comprising the FSC as described above, where the products are integrated in the first MI integrator 290. The result from the first MI integrator 290 is sent to the first squaring circuit 265 and is squared. In a similar manner, the second MI circuit 250, the third MI circuit 255, and the fourth MI circuit 260 operate with the corresponding second SR 230, third SR 235, and fourth SR 240 respectively, except that the multiplications performed by the respective MI circuits use a different portion of the FSC. The products from the squaring circuits 265, 270, 275 and 280 are then integrated in the integrator 285. The result of the integrator 285 is passed to the real and imaginary component adder 220 where it is added to a result produced by the imaginary component circuit 215 to produce the matched filter 130 output for the time index represented by the new chip. The next chip is then shifted into the MSB of the first SR 225, and the process repeats. The operations performed by the MI circuits 245, 250, 255, and 260 may be performed in parallel, or sequentially. In the latter case, the integrator 285 waits until the products are received from the squaring circuits 265, 270, 275, and 280 before generating the sum to be sent to the real and imaginary component adder 220.

The coherence window of the FSC matched filter 130 is considered a reduced coherence window because the number of chips processed at a time by each MI circuit is less than the number of chips per symbol. The phase rotation is cumulative and increases with the number of chips processed at a time by an MI circuit. Because only 64 of the 256 chips are processed at a time by each MI circuit, the carrier phase rotation for each periodic chip symbol is reduced to 112.50°, thereby preventing severe loss of signal energy at the output of the FSC matched filter 130. Further, the size of the coherence window (N) is determined from the desired phase rotation within the coherence window (Φ), the chip duration ($T_c$), and the actual frequency ($f_e$) using the equation:

$$N = ((\Phi/360)/T_c)/f_e$$

For example, where Φ=112.5°, $T_c$=244 ns and $f_e$=20 KHz, the size of the coherence window is 64 chips.

In an alternate embodiment (not shown), the real component circuit 210 comprises a 64 element buffer, coupled to an MI circuit, like the MI circuit 245, which is further coupled to a phase elimination circuit, for example, a squaring circuit like the squaring circuit 265. The real component circuit further comprises a 256 element shift register coupled to the buffer, and an additional storage device coupled to the squaring circuit, the storage device comprising four storage locations for storing numeric values. This storage device is coupled to an integrator, like the integrator 285, which is in turn coupled to a real and imaginary component adder like real and imaginary component adder 220. The imaginary component circuit is the same as the real component circuit, and is also coupled to the real and imaginary component adder.

In operation, another chip of the received signal is shifted into the 256 element shift register. The most significant 64 elements of the 256 element shift register are loaded into the 64 element buffer. The MI circuit then multiples each of the 64 elements with a corresponding element from the 64 most significant chips of the expected FSC using a multiplier like the multiplier 247. The MI circuit then integrates the products in an MI integrator similar to the MI integrator 290, and the squaring circuit squares the result produced by the MI integrator. The squaring circuit result is stored in the first location of the storage device. The process continues by loading the next 64 bits from the 256 element shift register into the 64 element buffer, where the MI circuit multiplies each of the elements of the 64 element buffer with a corresponding chip from the next 64 chips of the FSC. After the products are integrated, the result from the MI integrator is squared by the squaring circuit, and stored into the second location of the storage device. After all 256 elements from the shift register have been processed by the MI circuit, the integrator integrates the values from the four locations in the storage device, and this result is added to the value received from the imaginary component circuit by the real and imaginary component adder to produce a FSC matched filter output. A new chip is then shifted into the 256 element shift register, and the process repeats.

As the time required to receive the signal into the shift register is much greater than the time required by the matched filter to perform the arithmetic operations on the received signal, the hardware for this embodiment operates at a clock rate sufficient to perform all operations on the signal present in the shift register before the next chip is available to be shifted into the 256 element shift register.

Although the phase elimination circuit has been disclosed as a squaring circuit, the phase elimination circuit may be any circuit which is capable of removing the phase information from the result of the multiplying-integrating circuit. Thus, a circuit performing the absolute value function, or any circuit which is capable of removing the sign of a number and producing an output proportional, linearally, or non-linearally, to the magnitude of the input value is sufficient.

Having a matched filter with a reduced coherence window eliminates the need for frequency error hypothesizing, thereby reducing power consumption and the time required for synchronization. Where a 10 ppm oscillator resulting in a 20 KHz frequency error is used, the 64 chip coherence combining window reduces the carrier phase rotation per periodic channel symbol within the combining window to 112.5°, thereby eliminating the need for frequency error hypothesizing. This reduced carrier phase rotation per periodic channel symbol within each coherent combining window prevents severe loss of signal energy at the peaks of the matched filter output.

The output from the FSC matched filter 130 for each new chip processed is stored into an accumulator register in accumulator 140 at sequential time index locations. The output for the accumulator for time index I is expressed as:

$$A(l) = \sum_{i=1}^{N_1} C(i, l), l = 0, 1, \ldots, 2559$$

where $N_1$ is the number of slots used for slot synchronization (the size of the accumulation window), and C (i,l) is the matched filter output for time index I of the $i^{th}$ time slot. Thus, after 2560 iterations, the accumulator register contains the FSC matched filter output for the equivalent of one time slot of the received signal. As the matched filter 130 is "tuned" to the FSC, a peak of signal energy occurs at the time index in the accumulator register representing the time slot boundary. As the FSC is transmitted in the same location of every time slot, after accumulation of between 64 and 80 time slots of data, the peak of signal energy due to the FSC should be significantly greater than energy peaks formed over the remainder of the time slot. However, where a 10 ppm oscillator is used, the energy peak representing the time index of the FSC, and thus the time slot boundary in the accumulator register, can drift away from the true time slot boundary at a rate of up to 0.026 chips per time slot. This results in the energy peak drifting nearly a complete time index after accumulation of 32 time slots of signal, thereby dispersing the energy peak representing the time slot boundary over more than one time index. This is shown in FIGS. 4 and 5.

Figure 4:
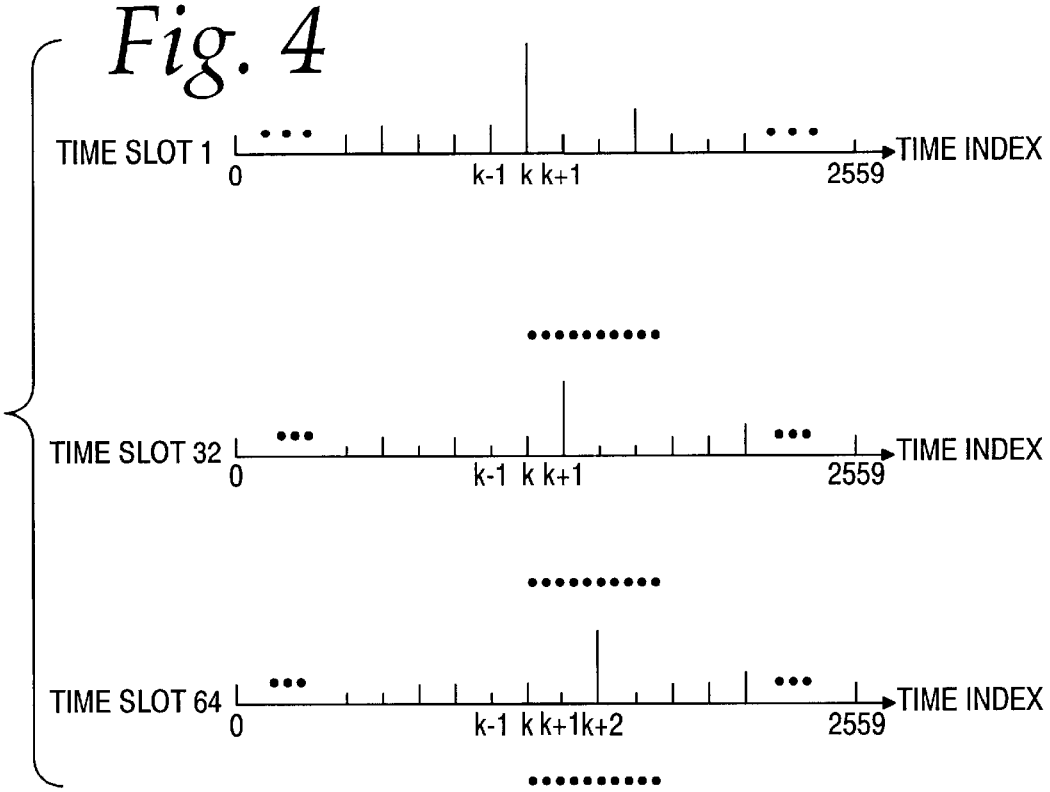
FIG. 4 illustrates the output from the FSC matched filter of FIG. 3a for selected time slots in accordance with an embodiment of the invention.

In FIG. 4, the FSC matched filter 130 output for three select time slots are shown. At time slot 1 of FIG. 4, the FSC matched filter 130 generated an energy peak representing the time slot boundary at time index K, where K is an arbitrary number representing that the time index may occur anywhere within the time slot. At time slot 32, where K represents the true time slot boundary, the output generated by the FSC matched filter 130 is accumulated and stored into the time index K+1 as a result of drifting due to the oscillator error. At time slot 64, the time index representing the time slot boundary has drifted to the time index K+2 because of the error due to the oscillator.

Figure 5:
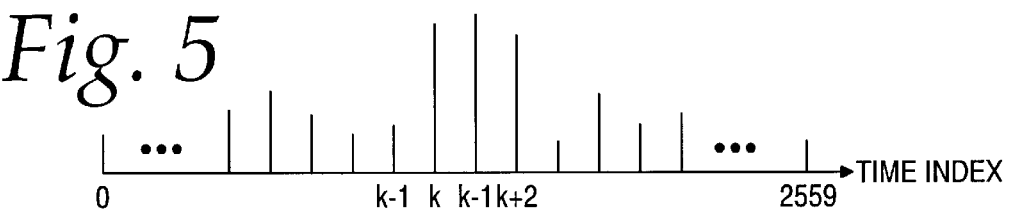
FIG. 5 shows the accumulator output.

FIG. 5 shows the output from the accumulator 140 after 64 time slots of data have been accumulated. Although the true time slot boundary occurs at time index K, three energy peaks of roughly equal energy are produced at the output of the accumulator 140, at time indices K, K+1, and K+2 as a result of the oscillator error. This presents a problem when the second stage of synchronization attempts to locate the time slot boundary.

In order to better pinpoint the time slot boundary for the second stage of synchronization, the circular sliding integrator 150 is introduced to combine the dispersed energy.

The circular sliding integrator 150 includes a processor coupled to a storage is device. The processor is coupled to the accumulator 140, and the storage device is further coupled to the sorter 160. The storage device comprises 2560 storage locations, where each location corresponds to a time index in a time slot. The circular sliding integrator 150 integrates the energy from the accumulation register over an integration window of time indices. This integration window is determined using the oscillator error, the size of the accumulation window and the chip duration, and is generally one more time index than the number of time indices over which the time slot boundary will drift during the accumulation process. For example, assuming a 10 ppm oscillator and an accumulation window of 64 time slots, the energy peaks representing the time slot boundary would at most drift by two time indices in either direction. Thus, the integration window size would be three time indices. The output from the circular sliding integrator for a time index I is expressed as $$B(l) = \sum_{j=l-K}^{l+K} A\ (j\ \text{mod}\ 2560)$$

where j represents the time index of the integration window of 2K+1 time indices, K being one-half the number of time indices that the energy peak drifts during accumulation, and A s) being the accumulator output for the $j^{th}$ time index.

In operation, the processor integrates the energy over the integration window of time indices, where the result is stored into the storage device at a storage location corresponding to the middle time index of the integration window. The circular sliding integrator 150 then slides the integration window by one time index, integrates the energies over the integration window, and stores the result into the next location of the storage device. The process repeats until the circular sliding integrator has integrated over all 2560 time indices. When the integration window extends beyond the $2560^{th}$ time index, the integration window extends to the first time index, thereby operating in a circular fashion.

Figure 6:
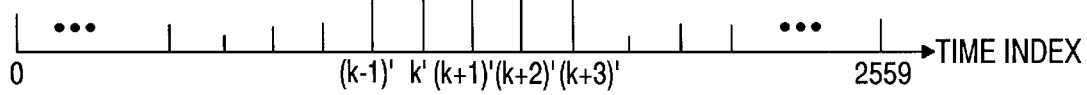
FIG. 6 shows the circular sliding integrator output in accordance with an embodiment of the invention.

An example of the operation of the circular sliding integrator 150 will now be described, the circular sliding integrator 150 having a three time index integration window and the accumulator output of FIG. 5 as an input. The output generated by the circulator sliding integrator 150 is stored into the storage device as represented in FIG. 6. The processor receives the values representing energy peaks at locations K–1, K, and K+1 from the accumulator output, integrates these values, and stores the result into the storage location of storage device 510 represented by time index K', as shown in FIG. 6. The processor then slides the integration window one time index and retrieves the values at time indices K, K+1, and K+2 of the accumulator output, integrates the retrieved values, and stores the result in the storage device at the storage location representing the time index (K+1)' as shown in FIG. 6. This process repeats until all 2560 time index values of the accumulator output are integrated over the integration window. When the integration window extends beyond time index 2559, the processor extends the integration window to the first time index, time index 0, thereby operating in a circular fashion.

Thus, the input to the circular sliding integrator may be three energy peaks of roughly equal size shown in FIG. 5 as K, (K+1) and (K+2), resulting from oscillator error and multipath interference representing the time slot boundary, or the input to the circular sliding integrator may be a single large energy peak resulting from noise in the received signal (not shown).

The output of the circular sliding integrator 150 for the three energy peaks of roughly equal size shown in FIG. 6 includes an energy peak at (K+1)' which is significantly greater than the dispersed energy peaks resulting from the oscillator error and multipath interference, as it represents integration of all three of the dispersed energy peaks representing the time slot boundary. This energy peak at (K+1)' is at most one time index value off, thereby better pinpointing the time slot boundary. The output of the circular sliding integrator for the single large energy peak resulting from noise is three energy peaks of roughly equal size (not shown).

Having the circular sliding integrator increases the effectiveness of the initial synchronization stage by combining the dispersed energy peaks of the accumulator output due to the oscillator error. By combining the dispersed energy peaks, the time index representing the time slot boundary is more accurately pinpointed for the next stage of the synchronization process. Additionally, because the dispersed energy representing the time slot boundary is combined, the noise immunity of the system is increased. This is because the circular sliding integrator increases the energy peak due to the time slot boundary by a greater amount than the energy peaks due to noise.

The output of the circular sliding integrator 150 is sent to the sorter 160.

The sorter 160 is provided for determining a specified number of candidate time indices from the output of the circular sliding integrator 150, where each candidate represents a potential time slot boundary, to be sent to the next stage of the synchronization process. The sorter 160 accomplishes this by scanning all of the 2560 storage locations of the circular sliding integrator 150 storage device to locate the largest value. The time index corresponding to the largest value from the storage device represents the strongest candidate for the time slot boundary. The sorter 160 stores this candidate time index into a memory location. The sorter 160 then sets the value of the storage device storage locations one before and one after the identified time index to zero, thereby excluding time index values indicating large energy peaks resulting from the sliding integration process. The sorter 160 then scans the storage locations of the storage device 510 for the time index corresponding to the next largest value, representing a second candidate for the time slot boundary. Once found, the sorter 160 stores this second candidate time index, and zeroes out its neighbor time indices. This process is repeated until a specified number of candidates for the time slot boundary have been determined. The specified number of candidates may be determined experimentally during the design process, and will generally be two. However, the greater the number of candidates sent to the second stage of synchronization increases the probability that the true time index candidate for the time slot boundary is considered during the second stage of synchronization.

Operation of the sorter 160 will be discussed having an input represented by the output of the circular sliding integrator 150 shown in FIG. 6. The sorter 160 scans the energy peaks of the time indices stored into the storage device at the output of the circular sliding integrator 150 for the largest energy peak. This largest energy peak occurs at time index value (K+1)'. The sorter then zeroes out the energy peak values is K' and (K+2)' to eliminate time index values having large energy peaks resulting from the sliding integration process. The sorter 160 then scans the storage device of the circular sliding integrator 150 for the energy peak having the second greatest value, which may be a result of noise received at the receiver. After the time index of the second largest energy peak is determined, the time indices on either side are zeroed out to eliminate potentially large energy peaks resulting from the circular integration process. The sorter 160 repeats this until the specified number of time index candidates is determined. These time index candidates are sent to the next stage of the synchronization process.

Because more than one time index value is sent to the next stage of the synchronization process by the sorter 160, the probability of the time index value representing the time slot boundary being sent to the next stage of the synchronization process is increased, especially in situations where noise has occurred causing an energy peak greater than that of the FSC in the circular sliding integrator output.

As will be appreciated by one of ordinary skill in the art, the present invention may be embodied as methods or devices. Accordingly, the present invention may take the form of an entirely hardware embodiment, an entirely software embodiment, or an embodiment combining hardware and software aspects. Thus, although the FSC matched filter 130, the circular sliding integrator 150 and the sorter 160 are shown as distinct elements combining hardware and software, they may be designed completely in software operating on a single piece of hardware having a suitable processor for carrying out the functions performed by each element.

Thus, a system and method for achieving slot synchronization in a W-CDMA system in the presence of large initial frequency errors has been provided. An inventive FSC matched filter having a reduced coherence window is provided for reducing the degradation of a symbol due to carrier phase rotation resulting from oscillator error to prevent severe loss of signal energy at the peaks at the FSC matched filter output. Additionally, a circular sliding integrator is provided to combine the signal energy disbursed during the accumulation process due to the oscillator error and multipath interference, thereby aiding in the location of the time slot boundary by increasing the energy at the time index representing the time slot boundary. Further, a sorter is provided for determining the predetermined number of largest time index candidates, thereby increasing the probability that the true time index candidate for the time slot boundary is sent to the second stage of the synchronization process. The disclosed invention eliminates the need for frequency error hypothesizing, thereby reducing power consumption and synchronization time.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

I claim:

1. A receiver for improving initial slot synchronization in a Wideband code division multiple access communications system by overcoming oscillator error, the receiver comprising:
   a matched filter receiving a signal including a first search code (FSC), the matched filter utilizing a reduced coherence window for decreasing the degradation of a symbol due to a carrier phase rotation resulting from the oscillator error;
   an accumulator coupled to the matched filter for accumulating an output of the matched filter over an accumulation window of time slots;
   a circular sliding integrator coupled to the accumulator for combining dispersed energy from an output of the accumulator over an integration window; and
   a sorter coupled to the circular sliding integrator for determining a specified number of candidate time indices for a time slot boundary using an output of the circular sliding integrator.

2. The receiver of claim 1 wherein the matched filter is a FSC matched filter.

3. The receiver of claim 1 wherein the size of the coherence window is determined using a desired phase rotation, a chip duration, and an actual frequency error due to the oscillator.

4. The receiver of claim 1 wherein the matched filter includes:
   a shift register having a number of elements less than a number of chips comprising the symbol, for holding a portion of the received signal;
   a multiplying-integrating processing circuit coupled to the shift register for multiplying the portion of the received signal in the shift register with a portion of the FSC, and integrating the products; and
   a phase elimination circuit coupled to the multiplying-integrating processing circuit for removing phase information from a result produced by the multiplying-integrating processing circuit.

5. The matched filter of claim 1 wherein the circular sliding integrator is a first integrator, and further comprising:
   a shift register having a number of elements equal to a number of chips comprising the symbol for receiving the received signal;
   a buffer coupled to the shift register for receiving a portion of the received signal from the shift register;
   a multiplying-integrating processing circuit coupled to the buffer for multiplying the portion of the received signal in the buffer with a portion of the FSC, and integrating the products;
   a phase elimination circuit coupled to the multiplying-integrating processing circuit for removing phase information from a result produced by the multiplying-integrating processing circuit;
   a storage device coupled to the phased elimination circuit for storing a result produced by the phase elimination circuit; and
   a second integrator coupled to the storage device for integrating the stored results.

6. The receiver of claim 1 wherein the size of the accumulation window is determined using a signal-to-noise ratio.

7. The receiver of claim 1 wherein size of the integration window is determined using the oscillator error, a chip duration, and size of the accumulation window.

8. A receiver for improving initial slot synchronization in a Wideband code division multiple access communications system by overcoming oscillator error, the receiver comprising:
   a matched filter receiving a signal including a first search code (FSC), the matched filter utilizing a reduced coherence window for decreasing degradation of a symbol due to a carrier phase rotation;
   an accumulator coupled to the matched filter for accumulating an output of the matched filter over an accumulation window of time slots; and
   an integrator coupled to the accumulator for combining dispersed energy from an output of the accumulator over an integration window.

9. The receiver of claim 8 wherein the matched filter is a FSC matched filter.

10. The receiver of claim 8 wherein the size of the coherence window is determined using a desired phase rotation, a chip duration and an actual frequency error due to the oscillator.

11. The receiver of claim 8 wherein the matched filter includes:
   a shift register having a number of elements less than a number of chips comprising the symbol, for holding a portion of the received signal;
   a multiplying-integrating processing circuit coupled to the shift register for multiplying the portion of the received signal in the shift register with a portion of the first search code, and integrating the products; and a phase elimination circuit coupled to the multiplying-integrating processing circuit for removing phase information from a result produced by the multiplying-integrating processing circuit.

12. The matched filter of claim 8 wherein the integrator is a first integrator, and further comprising:
   a shift register having a number of elements equal to a number of chips comprising the symbol for receiving the received signal;
   a buffer coupled to the shift register for receiving a portion of the received signal from the shift register;
   a multiplying-integrating processing circuit coupled to the buffer for multiplying the portion of the received signal in the buffer with a portion of the FSC, and integrating the products;
   a phase elimination circuit coupled to the multiplying-integrating processing circuit for removing phase information from a result produced by the multiplying-integrating processing circuit;
   a storage device coupled to the phased elimination circuit for storing a result produced by the phase elimination circuit; and
   a second integrator coupled to the storage device for integrating the stored results.

13. The receiver of claim 8 further comprising a sorter coupled to the integrator for determining a specified number of candidate time indices for a time slot boundary using an output of the integrator.

14. A receiver for improving initial slot synchronization in a Wideband code division multiple access communications system by overcoming oscillator error, the receiver comprising:
   a matched filter receiving a signal including a first search code (FSC) for decreasing degradation of a symbol due to a carrier phase rotation;
   an accumulator coupled to the matched filter comprising a predetermined number of storage locations for accumulating an output of the matched filter over an accumulation window of time slots; and
   an integrator coupled to the accumulator for combining dispersed energy from an output of the accumulator over an integration window.

15. The receiver of claim 14 wherein the size of the integration window is determined using an oscillator error, a chip duration and size of the accumulation window.

16. The receiver of claim 14 wherein the predetermined number of storage locations equals the number of chips comprising the symbol, and the integrator is a sliding integrator wherein the integration window moves across the predetermined number of storage locations.

17. The receiver of claim 16 wherein the sliding integrator is a circular sliding integrator, wherein when the integration window extends beyond a final storage location, the integration window extends to a first storage location, thereby operating in a circular fashion.

18. The receiver of claim 14 further comprising a sorter coupled to the integrator for determining a specified number of candidate time indices for a time slot boundary using an output of the integrator.

19. A method for improving slot synchronization in a Wideband CDMA communications system by overcoming oscillator error, the method comprising:
   receiving a signal including a first search code (FSC);
   filtering the received signal using a matched filter having a reduced coherence window;
   accumulating the filtered signal over an accumulation window of time slots to overcome noise in the filtered signal; and
   integrating the accumulated signal over an integration window to combine dispersed energy in the accumulated signal.

20. The method of claim 19 wherein the step of filtering the received signal includes filtering the received signal using a FSC matched filter.

21. The method of claim 19 wherein the step of filtering the received signal includes:
   shifting a portion of the received signal in to a shift register;
   multiplying the portion of the received signal with a portion of the FSC and integrating the products using a multiplying-integrating processing circuit; and
   removing phase information from a result produced by the multiplying-integrating processing circuit using a phase elimination circuit.

22. The method of claim 19 wherein the step of filtering the received signal includes:
   shifting the received signal into a shift register;
   buffering a portion of the received signal from the shift register;
   multiplying the portion of the received signal with a portion of the FSC and integrating the products using a multiplying-integrating processing circuit;
   removing phase information from a result produced by the multiplying-integrating processing circuit using a phase elimination circuit;
   storing the result of the phase elimination circuit; and
   integrating the stored results.

23. The method of claim 19 wherein the step of accumulating the filtered signal further comprises determining a signal-to-noise ratio for the received signal.

24. The method of claim 19 wherein the step of integrating the accumulated signal further comprises moving the integration window across memory locations storing the accumulated signal.

25. The method of claim 24 wherein the step of moving the integration window includes extending the integration window to a first storage location for the accumulated signal when the integration window extends beyond a final storage location for the accumulated signal.

26. The method of claim 19 further comprising the step of determining a specified number of candidate time indices for a time slot boundary using the integrated signal.

27. The method of claim 26 wherein the step of determining the specified number of candidate time indices further includes:
   (a) determining a first candidate time index for a largest integrator output value;
   (b) zeroing out neighboring time index values of the first candidate time index;
   (c) determining an additional candidate time index for a next largest integrator output value and zeroing out the neighboring time index values of the additional candidate time index: and
   (d) repeating step (c) until the specified number of candidate time indices is reached.

28. The method of claim 26 further comprising the step of communicating the specified number of determined candidate time indices to a second stage synchronizer.

* * * * *